United States Patent [19]

Clark

[11] Patent Number: 4,568,937

[45] Date of Patent: Feb. 4, 1986

[54] INDUCTION LOOP VEHICLE DETECTOR

[75] Inventor: Michael A. G. Clark, Southampton, England

[73] Assignee: Microsense Systems, Limited, Hampshire, England

[21] Appl. No.: 500,433

[22] Filed: Jun. 2, 1983

[30] Foreign Application Priority Data

Jun. 3, 1982 [GB] United Kingdom ............... 8216253
Sep. 27, 1982 [GB] United Kingdom ............... 8227447

[51] Int. Cl.⁴ .................... G08G 1/01; G01R 33/12
[52] U.S. Cl. .................................. 340/939; 324/236; 340/941
[58] Field of Search ............... 340/939, 938, 941; 324/244, 233, 236, 225; 246/130, 122 R, 249

[56] References Cited

U.S. PATENT DOCUMENTS

| | | | |
|---|---|---|---|
| 3,820,100 | 6/1974 | Ballinger | 340/939 |
| 3,838,270 | 9/1974 | Ballinger | 340/939 |
| 3,863,206 | 1/1975 | Rabie | 340/941 |
| 3,863,555 | 4/1975 | Potter | 340/941 |
| 3,943,339 | 3/1976 | Koerner et al. | 340/941 |
| 3,989,932 | 11/1976 | Koerner | 340/941 |

FOREIGN PATENT DOCUMENTS

| | | | |
|---|---|---|---|
| 2715117 | 10/1978 | Fed. Rep. of Germany | 340/939 |
| 1338062 | 1/1971 | United Kingdom . | |
| 2063538 | 6/1981 | United Kingdom . | |
| 2065946A | 7/1981 | United Kingdom . | |
| 2066539A | 7/1981 | United Kingdom . | |
| 1598077 | 9/1981 | United Kingdom . | |

Primary Examiner—James J. Groody
Attorney, Agent, or Firm—Birch, Stewart, Kolasch & Birch

[57] ABSTRACT

An induction loop vehicle detector comprises an oscillator circuit having a plurality of capacitors switchable in circuit with a road loop under the control of a microcomputer to determine the oscillator frequency. The microcomputer monitors the oscillator frequency and controls the switching of the capacitors to periodically return the frequency to a predetermined value. A counter counts a predetermined number of oscillator cycles and gates of h.f. clock into a second counter whereby the count of the counter represents the oscillator period. A "vehicle detected" output is given when the monitored frequency alters by more than a predetermined amount, representing a decrease in the inductance of the loop. On detecting an increase in the inductance above a predetermined threshold the detector is inhibited for a predetermined time, e.g. about 1 second, to avoid errors caused by magnetic effects.

10 Claims, 11 Drawing Figures

INDUCTION LOOP VEHICLE DETECTOR

DESCRIPTION

1. Technical Field

This invention relates to induction loop vehicle detectors.

2. Background Art

A typical induction loop installation is shown in FIG. 1. The system consists of a loop of wire (typically 2 or 3 turns) buried approximately 50 mm below the road surface. The ends of the loop are returned, via a twisted pair, to the vehicle detector usually housed some distance away in the controller cabinet. A decrease in the inductance of the loop occurs when a vehicle is positioned over it. This is due to the conducting parts of the vehicle acting as a shorted turn secondary of a transformer, the loop being the primary winding. A decrease in the Q of the loop also occurs but is an unreliable parameter for detecting vehicle presence.

The decrease in inductance is sensed by the vehicle detector that outputs a signal to indicate the presence of a vehicle. Changes in inductance of less than 0.02% have to be detected whilst changes of more than 10% can occur.

A major problem with detecting small inductance changes for a reasonable length of time is that environmental drifts, often as high as an effective change in inductance of 20%, can occur. This change is attributed mainly to a change in capacitance of the feeder between the loop and the detector. Fortunately the environmental drift rate is generally less than that caused by vehicle movement.

Various schemes have been devised for determining the decrease in inductance, i.e. the presence of a vehicle, and compensating for environmental drift.

One popular scheme includes the loop as part of the resonant circuit of a free-running LC oscillator, see FIG. 2. The period of the oscillator is measured against a high frequency clock, using digital counters and hard-wired logic, to determine a decrease in period, as will occur when a vehicle is present.

Problems with this technique include the following: (i) since the frequency of the LC oscillator is at least partially determined by the inductance of the loop, the operating frequency can fall over a wide range (typically 20 kHz to 180 kHz). If more than one adjacent loops operate on the same frequency then crosstalk can occur. Although a means is usually provided to offset the operating frequency, intermittent crosstalk can still occur. This will happen if environmental drift or vehicle movement cause two operating frequencies to coincide. Furthermore, as vehicles move over a loop, FM sidebands are produced that extend over a wide bandwidth. These can be of sufficient amplitude to cause crosstalk. (ii) It is considered desirable, and is also mandatory in the UK, to operate only in a specific, relatively narrow, frequency band for electromagnetic compatibility reasons. (UK requires 62 kHz to 78 kHz.)

A further problem with known induction loops is (iii) that it is possible for an increase in inductance to occur should a magnetic material be placed within the field of the sensor loop. As the material is removed a negative change in inductance will occur. This will cause most currently available vehicle detectors to indicate the presence of a vehicle.

It has been found in practice that as some vehicles pass over a loop, the magnetic, rather than the shorted turn effect predominates, usually as the vehicle is leaving the loop. This is particularly true of high chassis lorries with steel braced radial tires. As they leave the field of the loop the vehicle detector senses a negative change in inductance and indicates the presence of a vehicle even though it has departed.

Obviously this effect can cause several problems, e.g. the incorrect operation of a traffic system, or the failure to operate a barrier. In certain situations it can cause a hazard.

It is the object of the present invention to reduce the above disadvantages of the prior detectors.

DISCLOSURE OF INVENTION

According to the invention, there is provided a vehicle detector comprising an oscillator circuit having capacitance means arranged to be connected to a road loop to determine the frequency of the oscillator circuit, means for monitoring the frequency of the oscillator circuit, a control processor arranged to control the capacitance of the capacitance means so as to periodically return the frequency to a predetermined value, and detector means arranged to produce an output signal indicative of a detected vehicle when the monitored frequency alters by more than a predetermined amount. Preferably the control processor is a microprocessor and the capacitance means comprises a plurality of capacitors arranged to be switched in and out of circuit with the road loop by the microprocessor. Thus the detector includes an LC oscillator which is continually returned to its original frequency by switching capacitors into and out of the tuned circuit. Environmental drift can thereby be compensated and this in turn overcomes crosstalk difficulties (problem (i)) in a predictable manner and allows the licensing requirements (problem (ii)) to be strictly complied with.

Further according to the invention, an induction loop vehicle detector comprises means for detecting a decrease in the inductance of an induction loop and in response thereto for providing a signal indicative of the presence of a vehicle, means for detecting an increase in the inductance above a predetermined threshold and means for inhibiting the detector for a predetermined time after detecting said increase. This effectively overcomes problem (iii). Preferably the means for detecting an increase in the inductance is arranged to produce a signal when the inductance exceeds an average or quiescent value by more than a predetermined amount and said signal starts a timer or stops the repeated resetting of a timer allowing it to complete its timing operation.

In one embodiment of the invention a plurality of capacitors are arranged to be selectively switchable in parallel with a road loop. The values of the capacitors may be in a binary sequence so that the capacitance may be directly set by a parallel binary control signal. In an alternative arrangement, the capacitors are arranged to be selectively connectable to taps in one winding of a transformer the other winding of which is connected to a road loop. In this way the need for accurately made capacitors of special values is eliminated, the capacitors merely needing to be matched to the same value. In a further development, the road loop may be selectively connectable to taps in a transformer winding, e.g. said other winding, whereby the loop inductance may be effectively multiplied under program control. This permits a very wide range of loop inductances to be dealt with and allows vehicle detection to be performed on the basis of the capacitance value and multiplier value output by the control processor.

DETAILED DESCRIPTION

Figure 1:
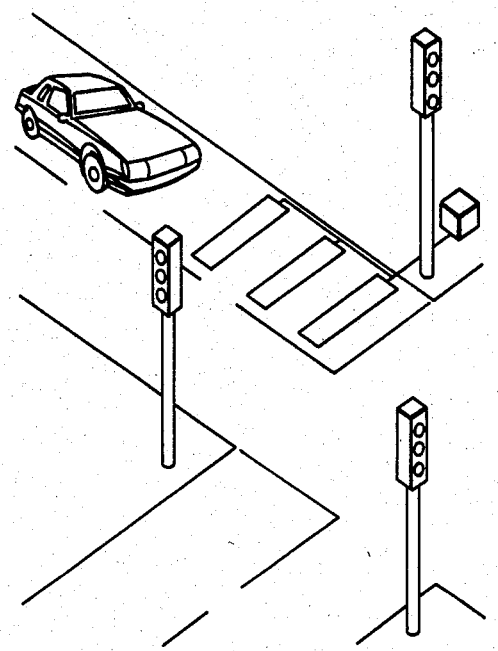
FIG. 1, already described, is a perspective view showing a typical loop installation.
Figure 2:
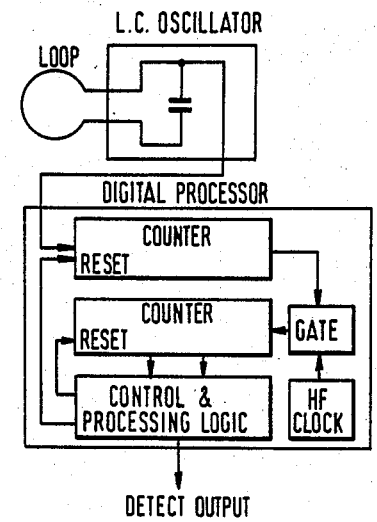
FIG. 2, already described, is a block diagram of a prior art vehicle detector circuit.
Figure 3:
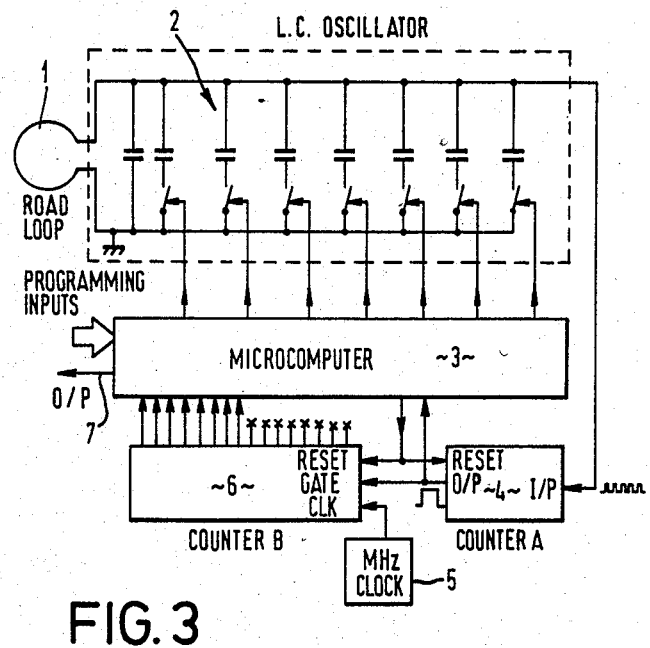
FIG. 3 is a block diagram of a vehicle detector circuit according to the invention.

Referring to FIG. 3, an oscillator circuit comprises a road loop 1 and a plurality of capacitors 2 arranged to be switched in circuit with the road loop 1 under the control of a microprocessor 3. The output of the oscillator circuit is supplied to a first counter 4, which is arranged to produce an output pulse while a predetermined number (192 in a practical implementation) of cycles of the oscillator circuit are counted. The output of first counter 4 gates the output of a high frequency (e.g. 6 MHz) clock 5 into a second counter 6 such that the counter 6 counts for the period of the output pulse of counter 4. The count attained by counter 6 thus represents the period of the oscillator circuit. The count attained by counter 6 is read by microprocessor 3 when the output pulse of counter 4 ends and the microprocessor then resets both counters so that another count cycle begins. Each count cycle takes typically a few milliseconds.

The microprocessor 3 operates to switch in and out of circuit various capacitors 2 on the basis of the count of counter 6 to tune the oscillator circuit towards a predetermined frequency. For example, if the period is found to have increased, the total capacitance is decreased. If the period is found to have decreased by more than a predetermined amount, this may be taken as an indication of the presence of a vehicle, and an output given on line 7.

As an example, the capacitors 2 may be related in a binary series and controlled by a binary output of microprocessor 3. For UK applications the frequency allocation of 62–78 kHz may be split into four bands, e.g. as follows:

| Band | Frequency (kHz) |
|---|---|
| A | 73.65–78.00 |
| B | 69.54–73.65 |
| C | 65.66–69.54 |
| D | 62.00–65.66 |

It may be seen that these bands are approximately 6% wide; a vehicle causes a change of up to 3% so a frequency selected towards the bottom of any band is unlikely to be brought into a higher band by the presence of a vehicle. In operation the microprocessor 3 first runs through a start-up routine (taking e.g. 60 ms) in which a base frequency in the lower half of the user-selected band is set up using a hill-climbing technique—the value of the capacitance is increased or decreased as required to move the frequency towards the desired value and the size of the capacitance change is progressively halved. When the desired count value is attained, the program changes to a detection mode in which the microprocessor checks that successive counts are correct and if not, corrects the capacitance by one value (the value of the smallest capacitor) to increase or decrease the period of the oscillator circuit as required to return the frequency to the preset base frequency. Any change in the count above a predetermined amount is recognised as caused by a vehicle and an appropriate "vehicle detected" output is provided. It would alternatively be possible to monitor the number output to the capacitors to provide an indication of the presence of a vehicle but it has been found simpler to monitor the count attained by counter 6.

Figure 4:
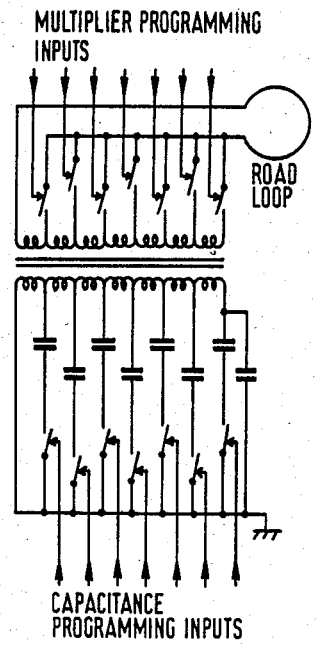
FIG. 4 is a schematic diagram showing a modified arrangement of capacitors.
Figure 8:
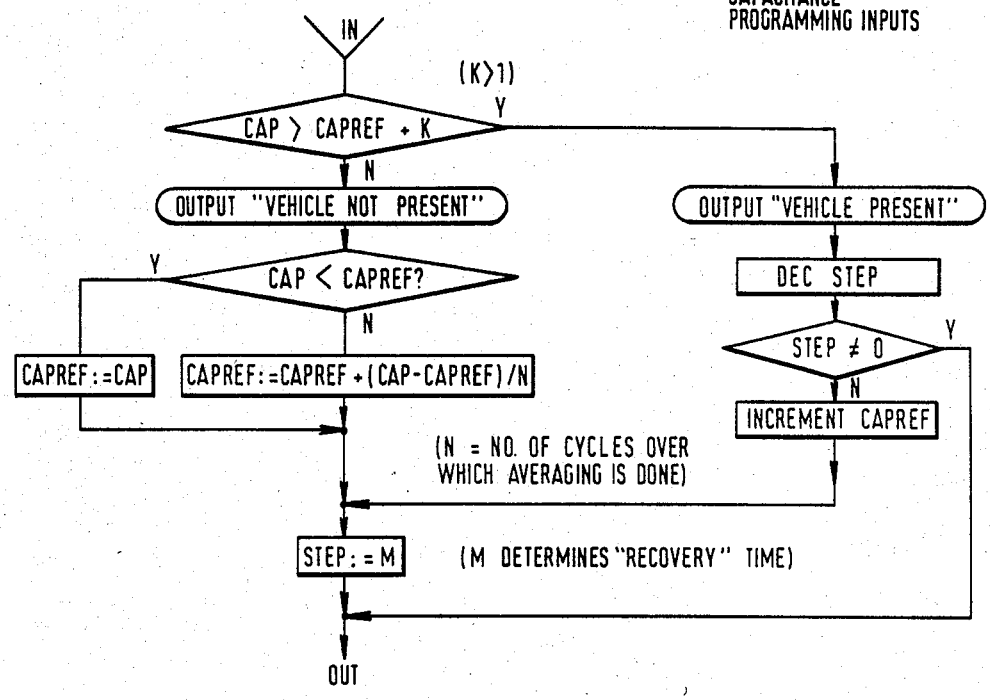
FIG. 8 is a software flowchart of a detection routine using capacitance change.
Figure 5:
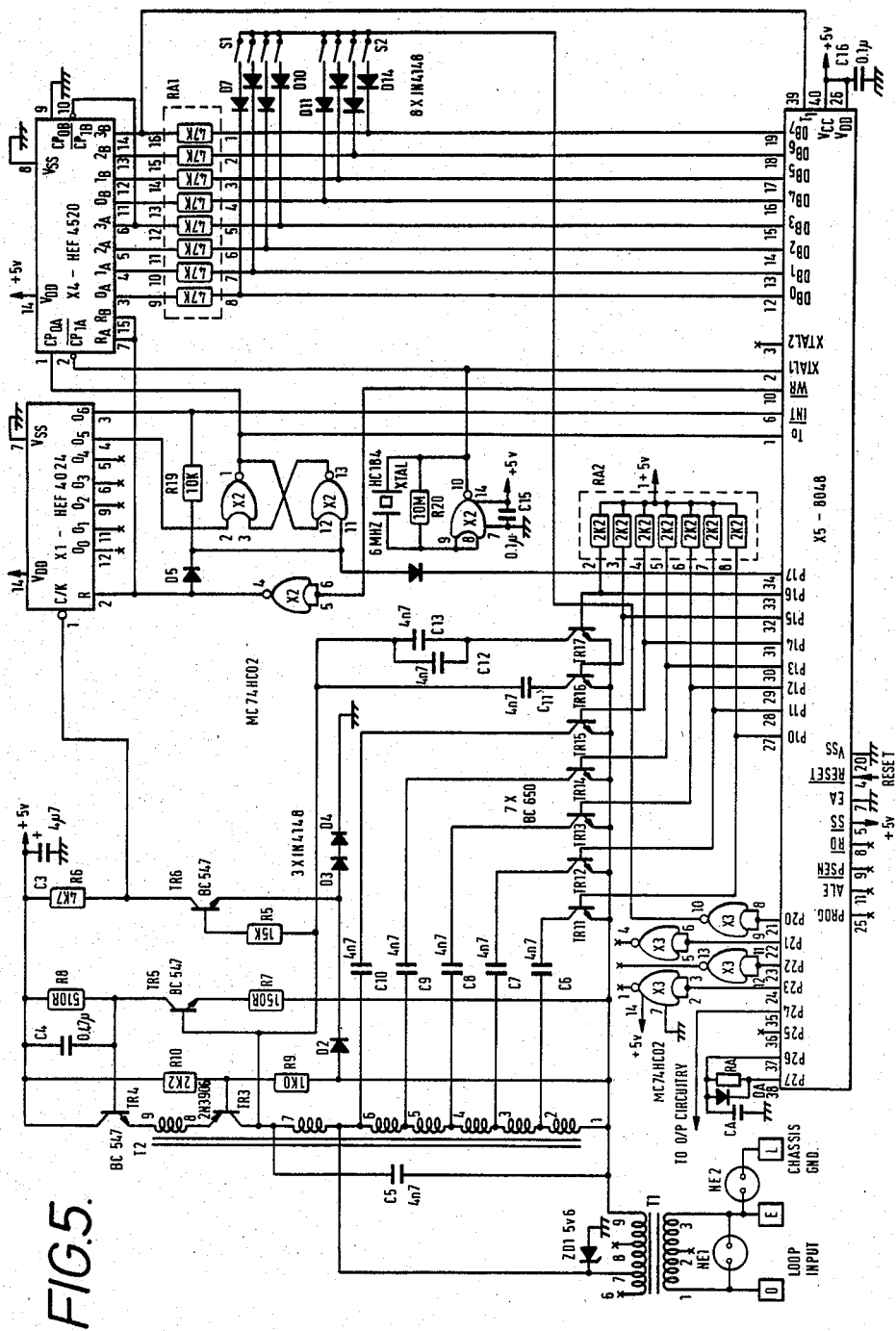
FIG. 5 is a circuit diagram of a vehicle detector according to the invention.
Figure 6A:
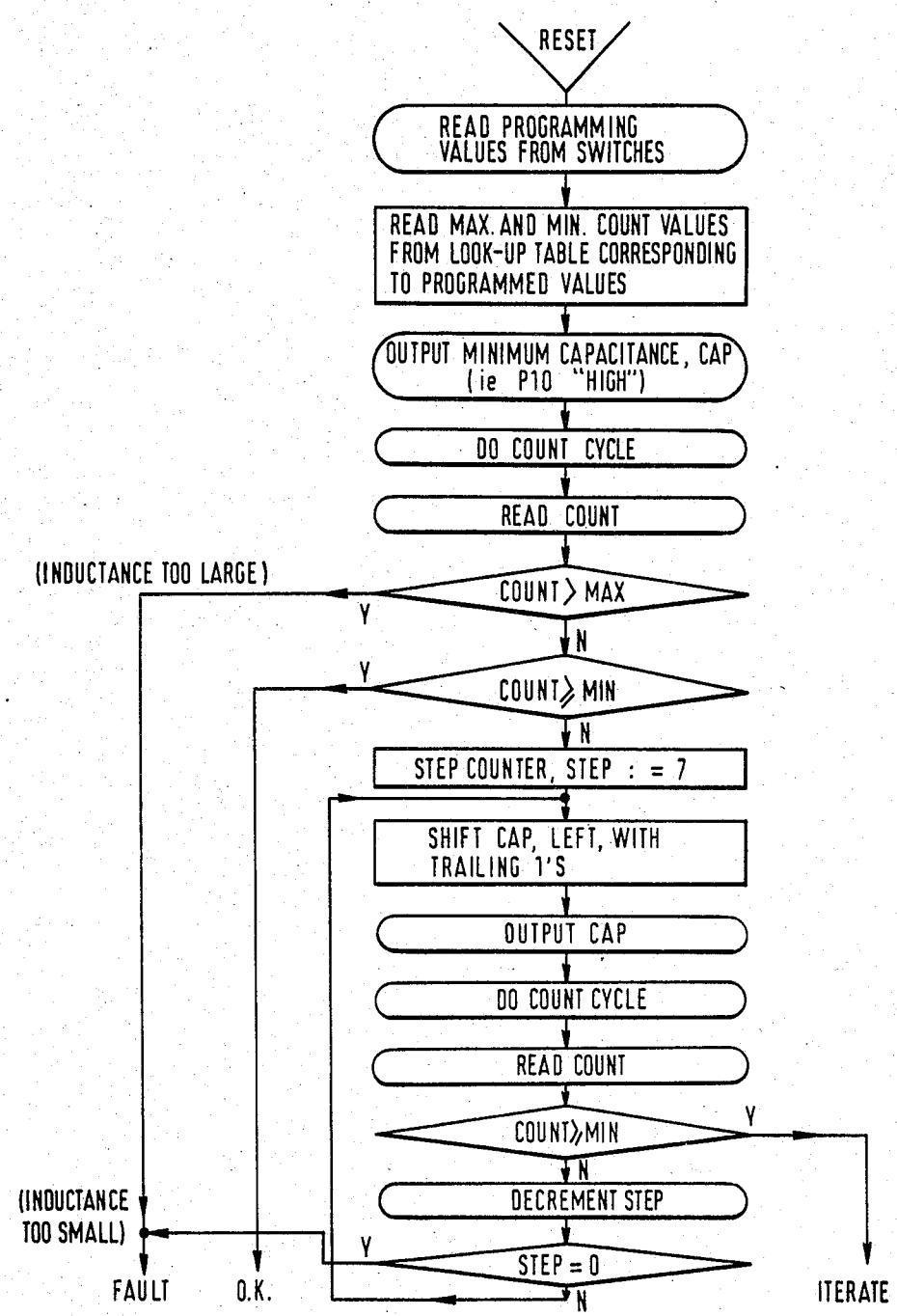
FIGS. 6a and 6b form a software flowchart of an initial tune routine.
Figure 6B:
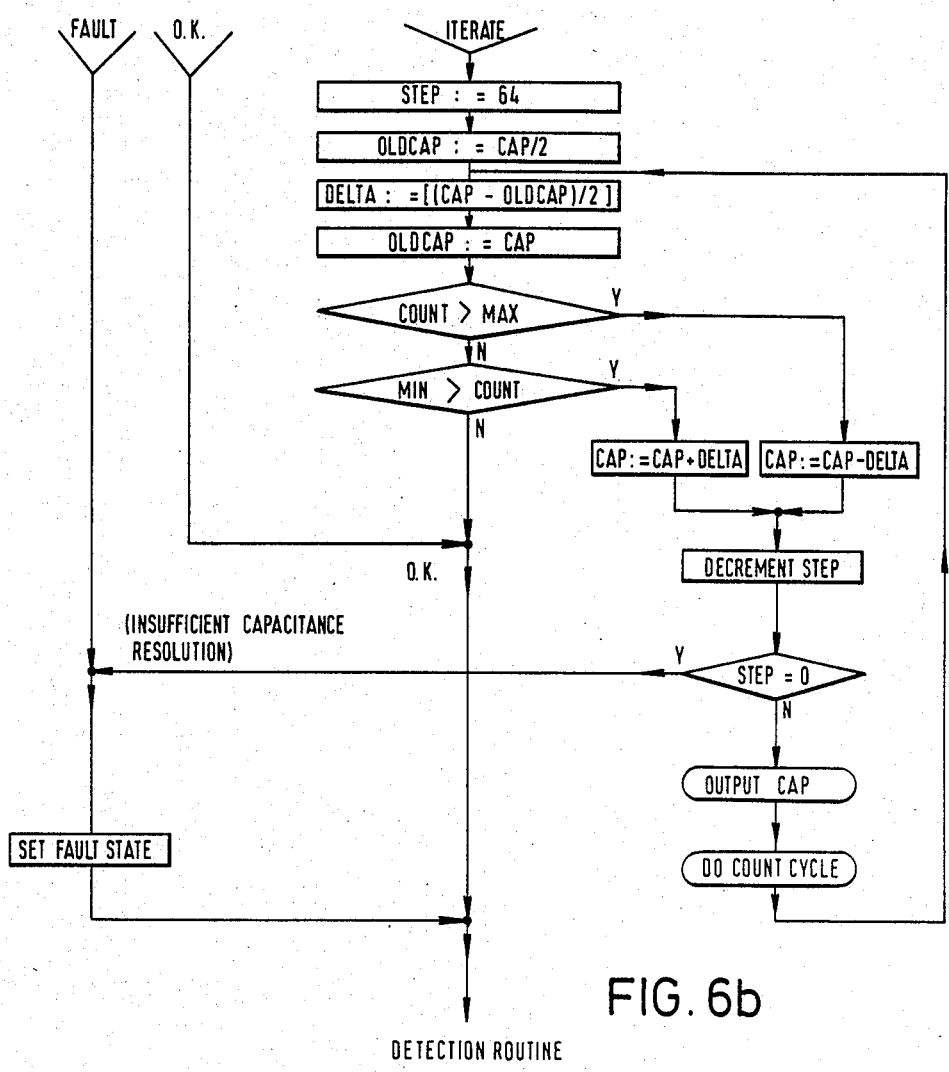

Although the capacitors could be used as shown in FIG. 3, the required relationship between them results in capacitance values that have to be manufactured especially. Furthermore a high accuracy is required (about 1%). This would be an expensive technique. It is, however, possible to use a tapped transformer as shown in FIG. 4. This allows the capacitors to be all of the same value and only matched accurately. The tappings are arranged to give an approximation to a constant percentage change as capacitors are switched in. The worst case is when a significance change is required, e.g. from 0001111 to 0010000. In the practical implementation a change of approximately 2.5% will occur in this case. Further, it is possible to extend the tapping technique to include "multiplier" tappings. This is also shown in FIG. 4. These "multiply" the loop inductance by a suitable amount. Using this technique a wide tuning range of high precision could be obtained. This would permit detection to be performed, not using the counters, but by examining the multiplier and capacitance programming values.

It is possible to provide multiplexed outputs for more than one loop. For example, the capacitance value could be time-sequentially multiplexed for four loops and the values could also be multiplexed so that the frequencies fall in the above four bands. In this way it is possible to operate 16 separate loops with the same detector apparatus.

A practical example of the invention will now be described in greater detail with reference to FIGS. 5 to 8. For reasons of clarity, a suitable power supply, 5 V, is not shown.

The road loop is connected to terminals D and E of the detector unit. Neon lamps NE1, NE2 and zener diode ZD1 are required to protect the circuitry against interfering, high energy sources such as lightning. Transformer T1 is a step-up transformer that in addition to raising circuit impedance to enable transistor switches to be used without seriously degrading Q, provides some degree of isolation.

The output of transformer T1 is connected to transformer T2. This is part of a feedback LC oscillator. The inductive part of the oscillator is formed mainly by the inductance of the road loop and partly by the shunt inductance of transformers T1 and T2. The capacitive part is largely capacitor C5 and capacitors C6 to C13 inclusive which can be switched in and out by transistors TR11 to TR17. Transistor TR3 is the active element of the oscillator, whilst transistor TR5 is used to control its gain so as to maintain constant amplitude oscillation. Resistors R5 to R10 provide suitable bias, etc. Capacitor C4 is used for feedback stabilisation and decoupling. Capacitors C3, C15 and C16 are used for decoupling. Diodes D2, D3 and D4 provide a bias voltage to prevent transistors TR11, TR17 (in conjunction with the gain control) from becoming reverse biased. Transistor TR6 is used to "limit" the sinusoidal voltage of the oscillator to form a square wave for application to the digital counter integrated circuit X1.

A microcomputer X5, type Intel 8048 or equivalent, is used to control the circuit. Ports P10 to P16 are configured as outputs, and can switch capacitors in and out of the circuit under software control. E.g. when a "low" signal is present on P10, transistor TR11 is reverse biased and switched OFF. When a "high" is present, assisted by the appropriate resistive element in resistor array RA2, transistor TR11 is turned ON, switching in capacitor C6.

Integrated circuit X1 is a 7-bit binary counter that "divides" the frequency of the oscillator and in conjunction with NOR gates A and B of integrated circuit X2, which form a flip-flop, generates a gating pulse. Operation of this circuit is as follows: assume there is a high voltage level on P17 of microcomputer X5. A "low" level reset pulse, of short duration, from $\overline{WR}$ of microcomputer X5 inverted by gate D of integrated circuit X2 resets both counters X1 and X4 and the flip-flop through diode D5. Pin 13 of integrated circuit X2 will go "low" and pin 1 "high" if not in this state already. Microcomputer X5 now causes P17 to go low causing pin 11 of integrated circuit X2 to be held "low".

Counter X4 requires a "low" level on pin 1 to count, so in this state it is not counting. The signal on pin 1 of counter X1 is "low" however, causing this counter to increment and when output O5 of counter X1 goes "high" the flip-flop will be set, allowing the 6 MHz clock to increment counter X4. The output of counter X4 (pin 14) is applied to the T1 input of microcomputer X5 which is connected to another 8-bit counter internally.

The output of counter X1 (pin 3) is applied to the $\overline{INT}$ line of microcomputer X5. Microcomputer X5 can interrogate this pin to determine its state. Each time a high to low transition is observed a "software counter" is decremented from a preset value (which can be 1, and is for tuning). When zero is reached P17 is made to go "high" so that when output O6 of counter X1 next goes high the flip-flop is reset via resistor R19 causing the count to counter X4 to be stopped. Since the output of the flip-flop is also applied to the T0 input of microcomputer X5, microcomputer X5 can determine the count has stopped. Assuming the output of integrated circuit X3, pin 10, is "low", the count achieved in counter X4 can now be read by microcomputer X5 on inputs DB0 to DB7, via resistors contained in array RA1. The internal counter can also be read if required. A new value of capacitance can also be output on P10 to P16 if required.

The cycle now repeats itself with a "low" reset pulse from $\overline{WR}$ of microcomputer X5.

The 6 MHz clock is generated using NOR gate C, quartz crystal, XTAL, and resistor R20. It is also used as a clock for microcomputer X5, and is applied to the XTAL1 input.

Programming information from switches S1 and S2 can be read by resetting counter X4 so as to cause the outputs to go "low" and outputting a "low" on P20, thereby causing pin 10 of integrated circuit X3 to go "high". Any one of the switches S1 or S2 that is closed will cause the appropriate line, DB0 to DB7 to be pulled "high" through diodes D7 to D14. Any line not so connected will be held "low" by counter X4 through array RA1.

Microcomputer X5 is reset by applying a "low" level on pin 4, operation occurs when a "high" level is reached. The appropriate external reset circuitry is not shown for clarity. Output P24 is used to indicate the presence or otherwise of a vehicle. The necessary output circuitry is not shown for clarity. This usually comprises one or two transistors and associated components and a relay or opto-isolator. Outputs P25 to P27 are not used (on a single channel circuit). Outputs P21 to P27 are effectively not used, neither are the NOR gates of X3 to which they are connected. All other outputs of microcomputer X5 are not used, and all inputs are connected to either "high" or "low" as appropriate to cause proper operation of the device.

Figure 7:
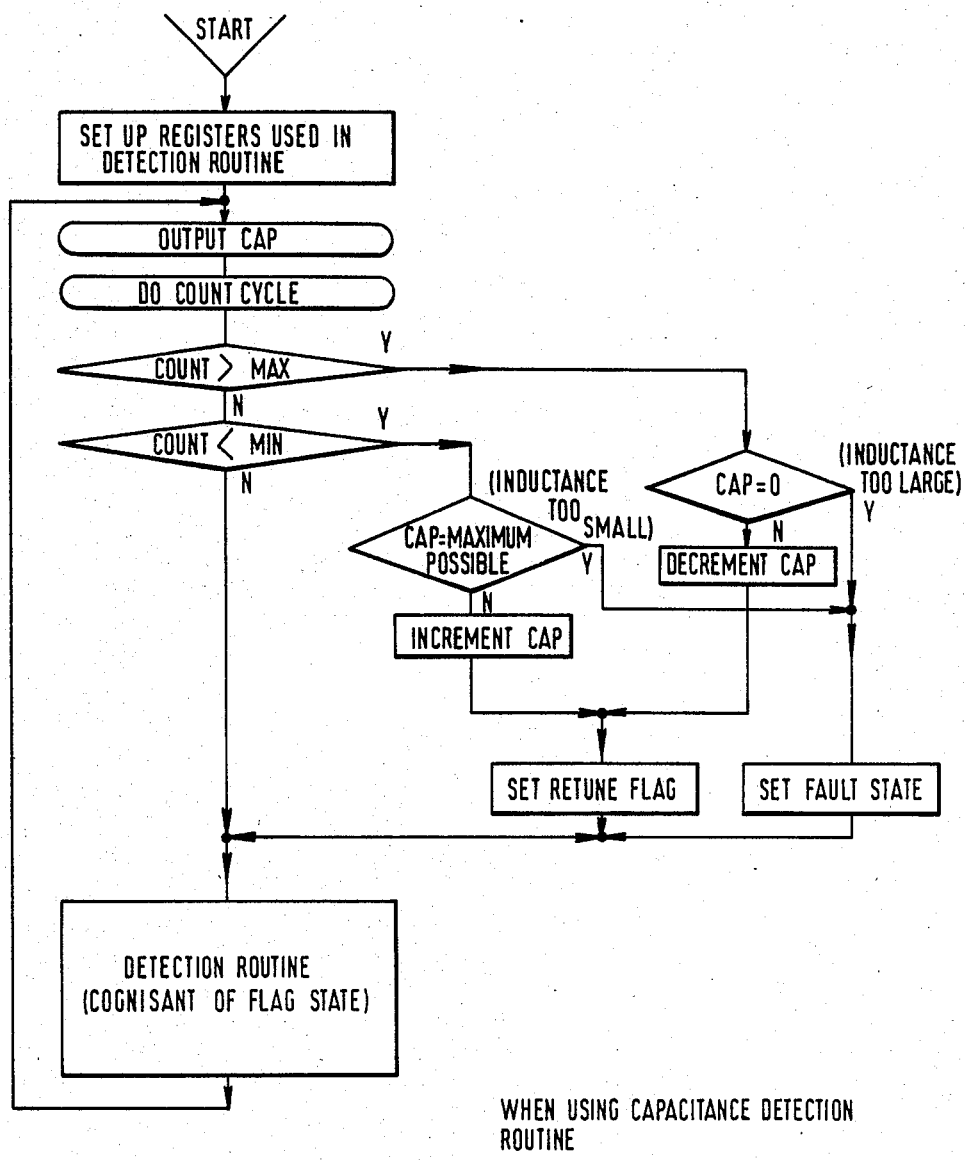
FIG. 7 is a software flowchart of a routine used whilst performing vehicle detection.

Upon receipt of a master reset the microcomputer performs an initial tune routine (FIG. 6), after which the device starts detecting the presence or not of a vehicle. A "nudge-nudge" technique is used to maintain the oscillator in the correct frequency band, (FIG. 7).

The detection routine that uses only the count samples is not described as there are numerous well-known ways of doing this.

If the capacitance detection technique (FIG. 8), were used it would require much greater capacitance resolution than 7 bits to obtain sufficient sensitivity for practical use. The multiplier technique of FIG. 4 would probably be suitable.

In essence the technique relies on the tuning routine maintaining approximately constant frequency (it does not matter if it is a bit slow), by adjusting CAP. When a vehicle is not present a running average CAPREF is calculated. Should CAP exceed CAPREF by more than the threshold, K, the presence of a vehicle is output. Whilst a vehicle is present CAPREF is slowly incremented towards CAP, at a rate determined by M, to compensate for environmental drift. A fast recovery is required should CAP become less than CAPREF, as will occur for example when a vehicle leaves the detection zone after having been there for some time.

Figure 9:
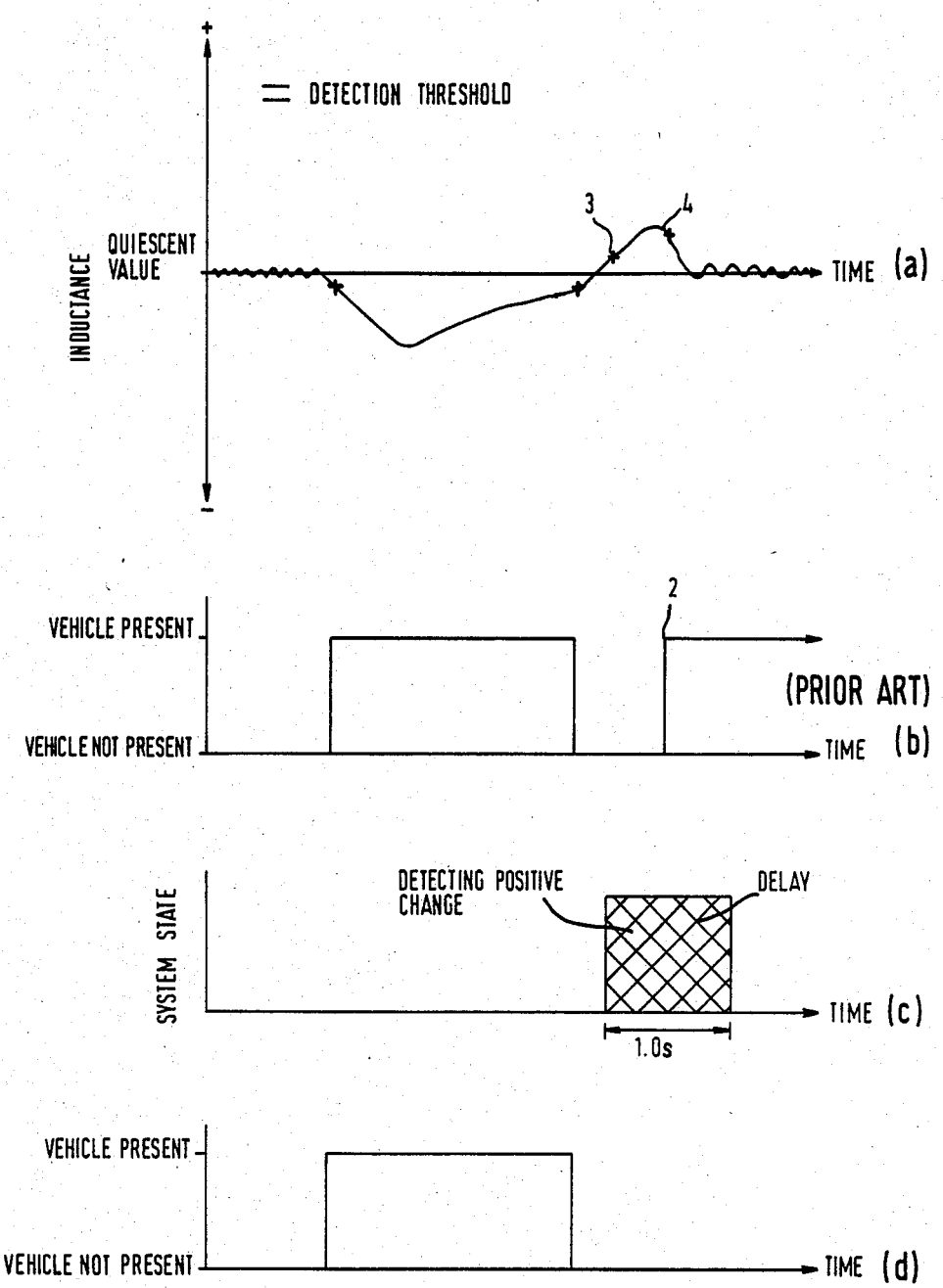
FIG. 9a is a timing diagram showing typical inductance variations as a vehicle passes over the loop.
FIG. 9b is a timing diagram showing the response of a prior art vehicle detector.
FIG. 9c is a timing diagram showing the delay feature in a vehicle detector according to the invention.
FIG. 9d is a timing diagram showing the response of the vehicle detector according to the invention.

FIG. 9(a) shows the typical "inductance profile" of a vehicle, exhibiting a magnetic effect passing over a loop. As the vehicle is leaving the loop the inductance first increases, which a conventional detector tracks rapidly, and then, as the vehicle finally leaves, decreases.

This negative change is sensed as a vehicle present by a conventional detector causing it to "lock-up", or register, a vehicle, as shown at 2 in FIG. 9(b).

The solution, that is the essence of this invention, is to sense that a positive change in inductance greater than a suitable threshold (e.g. 0.01% of nominal loop inductance) has occurred. The detection system is then "paralysed" for a suitable time (e.g. 1.0 seconds). During this time no action is taken other than to maintain a "no vehicle present" output state. After this time normal detection commences once more. The paralysis time is indicated in FIG. 9(c) and the resultant output in FIG. 9(d). Specifically, after the positive change in inductance greater than the threshold is detected at point 3 a timer is started and runs for 1s as shown in FIG. 9c and the output of the timer inhibits the detecting operation.

Figure 10:
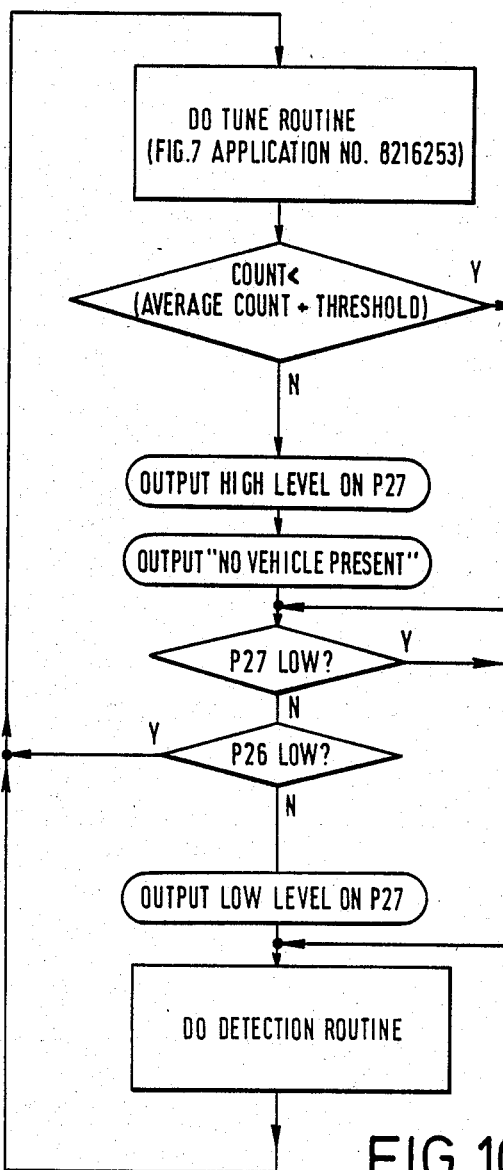
FIG. 10 is a software flowchart of a routine for inhibiting the response of the detector according to the invention.

A flow chart of a suitable routine contained within the microcomputer's memory is given in FIG. 10. The routine detects a positive change in inductance (COUNT decreases for a negative change in inductance). When a positive change in inductance is detected by the software routine, the microcomputer outputs a high level on output P27. This is integrated by the RC combination of capacitor CA and resistor RA. The values are chosen such that input P26 senses a high level after approximately 1.0 seconds. During this time interval the microcomputer ignores all output samples. When the time interval is over, normal detection processing continues and P27 is returned to a low level. Diode DA is required to ensure a fast reset. Obviously this delay could be generated using various circuit techniques, or alternatively could be generated by the software as has been done in another practical implementation.

In an alternative arrangement, the microcomputer could be arranged to detect a reduction in the inductance after the increase, i.e. to detect the peak 4 and the timer could be started then. In this case a shorter timing period, e.g. 0.8s, could be used.

Obviously, for one skilled in the art other modifications, variations and alterations may be possible within the spirit and scope of the claims.

What is claimed is:

1. A vehicle detector comprising: an oscillator circuit having capacitance means arranged to be connected to a road loop for determining the frequency of the oscillator circuit;

means for monitoring the frequency of said oscillator circuit;

a control processor arranged to control the capacitance of the capacitance means so as to periodically return the frequency to a predetermined value;

detector means for producing an output signal indicative of a detected vehicle when the monitored frequency alters by more than a predetermined amount, said detector means detecting a decrease in the inductance of the road loop and in response thereto for providing a signal indicative of the presence of a vehicle;

means for detecting an increase in the inductance above a predetermined threshold; and means, responsive to said means for detecting, for inhibiting the detector means for a predetermined time after detecting said increase in the inductance.

2. A vehicle detector as claimed in claim 1 wherein the control processor is a microprocessor and the capacitance means comprises a plurality of capacitors arranged to be switched in and out of circuit with the road loop by the microprocessor.

3. A vehicle detector as claimed in claim 1 wherein a plurality of capacitors are arranged to be selectively switchable in parallel with the road loop.

4. A vehicle detector as claimed in claim 1 wherein a plurality of capacitors are arranged to be selectively connectable to taps in one winding of a transformer, the other winding of which is connected to the road loop.

5. A vehicle detector as claimed in claim 1 wherein the road loop is selectively connectable to taps in a transformer winding whereby the loop inductance may be effectively multiplied under program control.

6. A vehicle detector as claimed in claim 1 wherein the detector means produces an output on the basis of a count representing the alteration in the frequency before said frequency is returned to the predetermined value.

7. A vehicle detector as claimed in claim 1 wherein the detector means produces an output on the basis of the change in the value of the capacitance means required to return the frequency to the predetermined value.

8. A vehicle detector as claimed in claim 1 wherein the detector means detects an increase in the inductance of said road loop and is arranged to produce a signal when said inductance exceeds an average or quiescent value by more than a predetermined amount and said signal starts a timer or stops the repeated resetting of a timer allowing it to complete its timing operation.

9. An induction loop vehicle detector comprising means for detecting a decrease in the inductance of an induction loop and in response thereto for providing a signal indicative of the presence of a vehicle, and means for detecting an increase in the inductance above a predetermined threshold and means for inhibiting the detector for a predetermined time after detecting said increase.

10. A vehicle detector as claimed in claim 9 wherein the means for detecting an increase in the inductance is arranged to produce a signal when the inductance exceeds an average or quiescent value by more than a predetermined amount and said signal starts a timer or stops the repeated resetting of a timer allowing it to complete its timing operation.

* * * * *